United States Patent Office 3,778,420
Patented Dec. 11, 1973

3,778,420
COPOLYMERS OF CYCLIC MONOOLEFINS AND CYCLIC POLYOLEFIN COMPOUNDS
James D. Brown and Carl A. Uraneck, Bartlesville, Okla., assignors to Phillips Petroleum Company
No Drawing. Filed July 27, 1970, Ser. No. 58,728
Int. Cl. C08f 17/00
U.S. Cl. 260—80.7
12 Claims

ABSTRACT OF THE DISCLOSURE

Cyclic monoolefins are copolymerized with cyclic polyolefin compounds. Further, copolymers of cyclic monoolefins, cyclic polyolefins, and acyclic olefins are prepared. The novel polymers produced have improved properties which enables them to be used successfully in various applications.

FIELD OF THE INVENTION

This invention relates to the preparation of polymers of cyclic monoolefins. In another aspect, the invention relates to the preparation of copolymers of cyclic monoolefins and cyclic polyolefinic compounds. In a further aspect, the invention relates to the preparation of copolymers of cyclic monoolefins, cyclic polyolefins, and acyclic olefins. In still a further aspect, the invention relates to new copolymers of cyclic monoolefins.

DESCRIPTION OF THE PRIOR ART

The preparation of polymers by the polymerization of cyclic monoolefins is known in the art. Exemplary of such polymer preparations is the polymerization of cyclopentene in the presence of tungsten or molybdenum chlorides in conjunction with organoaluminums to provide a linear polymer having a rather high proportion of gel. See Natta et al., Angew. Chem. Internat. Edit. 3, 723, 725 (1964). Recently, other catalyst systems have been discovered which produce linear polymers of cyclic monoolefins which are essentially gel free. However, the cycloolefin polymers which are so produced by the process of the prior art and which have a processable molecular weight range also have a very high degree of cold flow rendering the product difficult to handle during storage, shipment, and the like. Furthermore, the polymerization of cyclic monoolefins to low cold flow polymers results in polymers having very high molecular weights. These very high molecular weight polymers are unfit for processing in most industrial applications.

OBJECTS OF THE INVENTION

It is an object of this invention to provide polymers of cyclic monoolefins having a reduced tendency to cold flow. It is another object of the invention to provide polymers of cyclic monoolefins having satisfactory molecular weights for ease in processing. Other objects and advantages of the present invention will be apparent from a careful reading of the summary of the invention, the detailed description of the invention, the examples, and the claims.

SUMMARY OF THE INVENTION

We have discovered new copolymers of cyclic monoolefins and cyclic polyolefins.

Further, we have discovered new copolymers of cyclic monoolefins, cyclic polyolefins, and acyclic olefins.

Further, we have discovered a process of preparing copolymers of cyclic monoolefins and cyclic polyolefins which comprises contacting the monomers with a catalyst suitable for the olefin disproportionation reaction.

Further in accordance with the invention, we have discovered a process of preparing copolymers of cyclic monoolefins, cyclic polyolefins and acyclic olefins which comprises contacting the monomers with a suitable olefin disproportionation catalyst.

The copolymers of cyclic monoolefins and cyclic polyolefins exhibit reduced cold flow when compared to a homopolymer of the cyclic monoolefin of similar molecular weight.

The copolymers of cyclic monoolefins, cyclic polyolefins, and acyclic olefins exhibit reduced molecular weight at a given cold flow value when compared to the homopolymers of the cyclic monoolefin having a similar cold flow value. Additionally, the copolymers exhibit substantially reduced cold flow at a given molecular weight value when compared to homopolymers of the cyclic monoolefin having a similar molecular weight. In other words, the copolymers of cyclic monoolefins, cyclic polyenes, and acyclic olefins exhibit a balance of the properties of molecular weight and cold flow which enable these polymers to have particular utility in industrial applications, such as elastomeric products.

DETAILED DESCRIPTION OF THE INVENTION

The cyclic monoolefin monomers used to prepare the polymers of the invention comprise cyclic monoolefins having 5, and 7–10 carbon atoms in the ring, including alkyl substituted derivatives thereof, wherein the alkyl group has from 1 to about 6 carbon atoms per molecule and is located no closer than the 4- position with regard to the double bond. Exemplary compounds include cyclopentene, cycloheptene, cyclooctene, cyclononene, cyclodecene, 4-methylcyclopentene, 4-ethylcyclopentene, 4-hexylcyclodecene, and 4-pentylcyclopentene, and the like. Preferably, the cyclic monoolefin is unsubstituted.

The cyclic polyolefins employed are cyclic hydrocarbons having at least two carbon-carbon double bonds separated by one carbon-carbon single bond or fused ring cyclic polyolefins having at least one carbon-carbon double bond in each of at least two of the rings. The term "cyclic polyolefin" is meant to exclude those cyclic hydrocarbons or fused ring cyclic hydrocarbons in which each ring is aromatic in nature. Preferred cyclic polyolefins are conjugated diolefins having from 5 to about 12 carbon atoms per molecule. Cyclopentadiene, 1,3-cyclohexadiene, 1,3-cyclooctadiene, 1,3,5-cyclooctatriene, 1,3,5-cyclododecatriene, and 1,2,3,4,4a,8a-hexahydronaphthalene are exemplary of the preferred cyclic conjugated dienes which may be employed in the invention.

Preferred fused ring hydrocarbons which can be employed in the invention are those having from about 7 to about 20 carbon atoms per molecule. Exemplary preferred compounds include dicyclopentadiene, bicyclo(2,2,1)-hepta-2,5-diene, tricyclo(5,2,3,0,4,9)-dodeca-2,5,11-triene, bicyclo(2,2,2)-octa-2,5,7-triene and bicyclo(8,6,4)-eicosa-2,11-diene.

The acyclic olefins employed to prepare the cycloolefin, cyclic polyolefin, acyclic olefin terpolymers of the invention are nontertiary, acyclic mono- and polyenes having at least 2 carbon atoms per molecule, including cycloalkyl, cycloalkenyl, and aryl derivatives thereof, and mixtures of these olefins. Acyclic olefins having from 2 to about 30 carbon atoms are preferred. Especially good results are obtained with acyclic monoolefins and diolefins having from about 5 to about 10 carbon atoms per molecule. Nontertiary olefins are those olefins having at least one double bond wherein the carbon atoms, which are attached to each other by means of the double bond, are also attached to at least one hydrogen atom.

Some specific examples of acyclic olefins which are suitable comonomers include ethylene, propylene, 1-butene, 2-butene, 1-pentene, 2-pentene, 1-hexene, 1,4-hexadiene, 2-heptene, 1-octene, 2,5-octadiene, 2-nonene, 1-dodecene, 2-tetradecene, 1-hexadecene, 3-methyl-1-butene, 1-phenyl-2-butene, 4-octene, 3-eicosene, 3-heptene, 3-hexene, 1,3-pentadiene, 1,4-pentadiene, 1,4,7-dodecatriene, 2-methyl-4-octene, 4-vinylcyclohexene, 1,3-octadiene, 1,7-octadiene, 3,5-decadiene, 1,5-eicosadiene, 2-triacontene, 2,6-dodecadiene, 1,4,7,10,13-octadecapentaene, 8-cyclopentyl-4,5-dimethyl-1-decene, 6,6-dimethyl - 1,4 - octadiene, and the like, and mixtures thereof.

The polymerization of the above-described monomers is accomplished by the use of a catalyst known in the art as an olefin disproportionation catalyst. These catalysts have heretofore been employed to convert olefinic materials into other olefinic materials wherein the reaction can be visualized as the reaction between two first pairs of carbon atoms, the two carbon atoms of each first pair being connected by a double bond, to form two new pairs from the carbon atoms of the first pairs, the two carbon atoms of each new pairs being connected by a double bond. Although not completely understood, it is believed the disproportionation reaction occurs via a saturated transition state intermediate. Thus, the reaction can be illustrated by the following formulas:

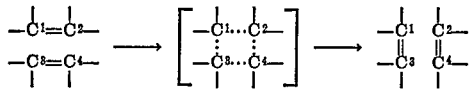

Other terms have been employed in the art to describe the olefin disproportionation reaction and catalysts which effect this reaction. They include such terms as "olefin reaction," "olefin dismutation," "transalkylidenation" and "olefin metathesis."

Any catalyst having activity for converting olefins in accordance with the above-described olefin disproportionation reaction can be employed to prepare the copolymers of the invention. These include both heterogeneous catalysts which are capable of olefin disproportionation activity in the presence or absence of a liquid hydrocarbon solvent and homogeneous catalysts which generally utilize the presence of a diluent during the reaction. Of course, where the olefin or monomer is liquid under normal reaction conditions, it can function as a diluent for the homogeneous catalysts. For the preparation of the copolymers of the invention, the homogeneous catalysts are preferred.

The heterogeneous catalysts which are particularly suitable for the polymerization reaction include tungsten oxide on silica, tungsten oxide on alumina, molybdenum oxide on alumina, rhenium oxide on alumina, molybdenum oxide on aluminum phosphate, molybdenum hexacarbonyl on alumina and any of the above in admixture with an organometal reducing agent such as methylaluminum sesquichloride. These catalysts are disclosed in U.S. Pats. 3,261,879 (Banks) of July 19, 1966; U.S. 3,365,513 (Heckelsberg) of Jan. 23, 1968; British Pat. 1,054,864 (British Petroleum) of Jan. 11, 1967; U.S. 3,463,827 (Banks) of Aug. 26, 1969; U.S. application Ser. No. 846,977 filed Aug. 1, 1969; and U.S. application Ser. No. 816,052 filed Apr. 14, 1969 now abandoned in favor of continuation application Ser. No. 102,883, filed Dec. 30, 1970.

The preparation, activation and maintenance of the heterogeneous olefin disproportionation catalysts are known in the art, and with reference to the specific systems discussed above, are disclosed in the above-mentioned patents and applications. The various solid catalysts exhibit different optimum reaction temperatures, pressures and contact times for the polymerization of the monomers of the invention. Generally, the preferred temperature, pressure, and time for the polymerization reaction will be substantially the same as the optimum conditions at which the olefin disproportionation catalyst will convert lower molecular weight acyclic olefins such as propylene, butenes, and pentenes. Excessively high reaction temperatures at which the monomers tend to decompose should be avoided.

The homogeneous catalysts which are particularly suited for the polymerization reaction comprise (a) a transition metal compound in admixture with (b) an organometallic compound. These catalysts are known in the art. Particularly suitable catalysts are disclosed in U.S. Pat. 3,492,278 (Uraneck et al.) of Jan. 27, 1970; U.S. application Ser. No. 810,021 filed Mar. 24, 1969 now U.S. 3,558,519 of Jan. 26, 1971; U.S. application Ser. No. 717,026 filed Mar. 28, 1968 now U.S. 3,558,515 of Jan. 26, 1971; and U.S. application Ser. No. 717,028 filed Mar. 28, 1968 now abandoned in favor of continuation application Ser. No. 137,676 filed Apr. 26, 1971. The most preferred homogeneous catalysts are those comprising a Group VI–B metal compound in admixture with an organoaluminum halide compound as disclosed in the 717,028 application.

Some suitable examples of the homogeneous catalysts which can be used include niobium pentachloride with triisobutylaluminum; tantalum pentachloride with triisobutylaluminum; molybdenum trichloride distearate with diethyl aluminum chloride, ethylaluminum dichloride, methylaluminum sesquichloride or ethylaluminum sesquichloride; bis(triphenylphosphine)molybdenum tetrachloride with methylaluminum sesquichloride; molybdenum hexacarbonyl or triphenylphosphine molybdenum pentacarbonyl with ethylaluminum dichloride; molybdenum trichloride dioctanoate with diethylaluminum chloride, tungsten tetrachloride distearate with diethylaluminum chloride; molybdenum trichloride dilaurate, molybdenum trichloride distearate, molybdenum oxychloride stearate or tungsten tetrachloride distearate with diethylmagnesium; bis(triphenylphosphine)rhenium oxytribromide, bis(triphenylphosphine)rhenium oxytrichloride or bis(triphenylphosphine)rhenium tetrachloride with ethylaluminum dichloride; and dinitrosylruthenium chloride, or bis[tris-(π-allyl)rhodium chloride] with methylaluminum sesquichloride.

The preparation and use of homogeneous catalysts to effect the olefin disproportionation reaction are known in the art. Generally, the optimum conditions at which the catalyst effects the olefin disproportionation of lower molecular acrylic olefins such as pentenes and hexenes are employed for the polymerization reaction. When using the homogeneous catalysts, the molar ratios chosen of the organometallic reducing agent to the transition metal compound is also a function of monomer purity. Cyclic monoolefin and cyclic polyolefin monomers frequently contain impurities which may react with the catalyst components. Accordingly, the monomers are preferably purified prior to contact with the homogeneous or heterogeneous catalysts. Molecular sieves can be employed to purify the monomers. The success of the purification operation will determine the optimum mol ratio of the organometallic compound to the transition metal compound. Whenever the feed does contain impurities, the organometallic compound is preferably used in molar excess with respect to the transition metal compound. The catalyst level in the homogeneous system is conveniently based on the amount of organometallic compound employed, and will generally be in the range of 0.15 to 150 gram millimoles per 100 grams of monomers.

As discussed above, the homogeneous catalyst is generally utilized in the presence of a diluent to accomplish the polymerization reaction. Any diluent which is essentially inert to the reaction (except in those cases where the monomer is employed as the diluent) can be employed. Aliphatic, cycloaliphatic, and aromatic hydrocarbons containing from 4 to 10 carbon atoms per molecule can be employed. Examples of such hydrocarbons are n-pentane, n-butane, n-hexane, isooctane, n-decane, cyclohexane, cyclopentane, methylcyclohexane, benzene, toluene, and xylene. Additionally suitable diluents are halogenated compounds such as chlorobenzene, tetrachloroethylene, and 1,2-dichloroethylene. Mixtures of any of these diluents can also be employed.

The amount of cyclic polyolefin comonomer used in the invention can be varied over a wide range. The resulting copolymer has significantly lower cold flow than that of the corresponding poly(cyclic monoolefin) homopolymer. The extent of the desired cold flow reduction will accordingly dictate the amount of cyclic polyolefin employed. Generally, significant cold flow reduction is achieved with amounts varying from 0.1 to 500 millimoles per 100 grams of cyclic monoolefin monomer (mhm) used, but preferably is in the range of 10 to 200 mhm. However, much larger amounts can be employed if desired. For example, up to 50 parts by weight of cyclic polyolefin per 100 parts by weight of combined cyclic monoolefin and cyclic polyolefin can be employed according to this invention, i.e., weight ratios of cyclic monoolefin/cyclic polyolefin of at least 50/50 can be used. The cyclic conjugated diene and/or fused ring hydrocarbons can be added initially or at any time prior to shortstopping of the polymerization reaction.

When preparing the cycloolefin, cyclic polyolefin, acyclic olefin polymer, the lower molecular weight acyclic olefins such as ethylene, propylene, butenes, pentenes, and hexenes are most frequently employed. The terpolymer exhibits a desirable balance of the properties of cold flow and molecular weight. The amount of lower molecular weight acyclic olefin employed generally determines the extent of the reduction in inherent viscosity. Single olefins or mixtures of olefins can be used in the process. Amounts are generally in the range of 0.01 to 10, preferably about 0.05 to 1.0, parts by weight per 100 parts by weight of the other monomers.

Any conventional contacting technique can be utilized to prepare the polymer, and batchwise or continuous operations are contemplated with both heterogeneous and homogeneous catalysts. After the reaction period, the polymer can be separated and isolated by conventional techniques such as by precipitation, coagulation, steam stripping, and the like. Unconverted monomer or products not desired can be recycled or discarded as desired. If desired, the catalyst can be destroyed using various materials well known in the art such as water or alcohol to deactivate the catalyst prior to separation of the products.

The copolymers of the cyclic monoolefins and cyclic polyolefins are believed to be characterized by linear chains of the cyclomonoolefin obtained by ring opening of the cyclomonoolefin and cyclic polyolefin monomeric units which retain at least one double bond within the polymerized unit. The cyclic polyolefin may be incorporated in the polymer chain in a random or nonrandom fashion. Although not completely understood, it is believed the reduction in cold flow obtained by incorporation of the cyclic polyolefin in the polymer backbone occurs by reaction of a double bond to give rise to branching. This is also believed to be true for fused ring cyclic polyolefins wherein the monomer unit is incorporated with retention of a double bond within a ring which is not opened. Branching is believed to occur at the available double bond of the comonomers. The terpolymers of the invention are evident from the reduction of inherent viscosity obtained by including into the monomer feed the lower molecular weight olefin. The lowering of the molecular weight and broadened molecular weight distribution is believed to occur via an olefin disproportionation cleavage reaction of the polymer and the lower molecular weight olefin. Once again, however, this mechanism is not completely understood, and it is only the best hypothesis for our invention.

The rubbery products prepared according to the invention have a good balance of properties. They can be oil extended and mixed with carbon black to give vulcanizates which have excellent properties. The raw polymers have a high degree of green strength. These properties allow the polymers of the invention to have a wide range of application. They can be employed alone as tire tread or carcass stock or blended with other rubbers or plastics. They can be used to improve the tack and green strength or rubbers such as butadiene/styrene emulsion copolymers, cis-polybutadiene and other solution-polymerized conjugated diene polymers. They can also be employed in adhesive formations. In the above applications, these polymers can be compounded and cured with conventional fillers, extenders, plasticizers, antioxidants, cure accelerators, crosslinking or curing agents, pigments, stabilizers and the like.

The invention is further illustrated by the following examples. However, the data as presented therein is for the purpose of illustration and should not be construed as limiting the scope of the invention as defined hereinabove.

EXAMPLE I

Cyclopentene was polymerized in a series of runs in the presence of variable amounts of cyclopentadiene to determine the effect of this compound on the cold flow of the copolymers as compared to the homopolymer of cyclopentene. Polymerization recipe and results are presented in Table I.

TABLE I (1) Conditions

Polymerization recipe:
  Toluene, parts by weight _____ 435
  Cyclopentene, parts by weight _____ 100
  Molybdenum trichloride dilaurate, mhm.[a] ____ 2.9
  Diethylaluminum chloride, mhm.[a] _____ 4.4
  Cyclopentadiene, mhm.[a] _____ Var.
  Temperature, °C. _____ 5
  Time, hours _____ 4

[a] Mhm.=millimoles per 100 g. of monomer (cyclopentene) charged (2) Results

| Run No. | Cyclopentadiene, mhm. | Percent of— | | | Inherent[c] viscosity | Gel[c] percent | Cold flow,[d] mg./min. |
| --- | --- | --- | --- | --- | --- | --- | --- |
| | | Unsaturation[a] | Conversion | Trans[b] | | | |
| 1 | 0 | 99 | 55 | 91 | 3.06 | 0 | 1.83 |
| 2 | 1.2 | | 56 | | 3.05 | 0 | 1.64 |
| 3 | 10.0 | 98 | 47 | 89 | 2.99 | 0 | 0.38 |
| 5 | 20 | | 54 | | 3.02 | 0 | 0.45 |
| 6 | 200 | 100 | 55 | 83 | 3.71 | 0 | 0.00 |

[a] Iodine monochloride titration assuming one double bond per monomer unit.
[b] Infrared analysis of carbon disulfide solutions of polymers employing an absorption band at 10.35 microns.
[c] Determined according to U.S. Pat. 3,278,508, col. 20, notes a and b.
[d] Cold flow is measured by extruding the rubber through a ¼-inch orifice at 3.5 p.s.i. pressure and a temperature of 50° C., after allowing 10 minutes to reach steady state, the rate of extrusion is measured and reported in milligrams per minute.

These results show the amount of cyclopentadiene can be varied over a wide range without producing gelled products. Furthermore, only small amounts of cyclopentadiene are required to give a significant reduction in cold flow of the products.

In these polymerizations, toluene was charged to the reactor first and then purged with nitrogen. The reactor was closed, flushed with argon and pressured with argon to 20 p.s.i.g. The molybdenum compound was charged next and the reactor contents cooled to about 0° C. in an ice bath. Cyclopentene was added followed by the organoaluminum compound. Temperature of the reactor contents was then adjusted to the level employed for the polymerization.

At the end of each polymerization, the reaction was shortstopped with a 10 weight percent solution of 2,2'-methylene-bis(4 - methyl-6-tert-butylphenol) is isopropyl alcohol, the amount used being sufficient to provide one part by weight of the antioxidant per 100 parts by weight of cyclopentene charged. The reaction mixture was then diluted with 435 parts by weight toluene per 100 parts by weight of cyclopentene charged and the mixture was agitated at 30° C. After thorough mixing had occurred, agitation was continued during addition of isopropyl alcohol to recover the polymer by coagulation. The liquid phase was discarded and the polymer was dried overnight under vacuum at 60° C. in a stream of nitrogen.

EXAMPLE II

Cyclopentene was polymerized in another series of runs in the presence of various amounts of dicyclopentadiene to determine the effect of this compound on the cold flow of the copolymers compared to the homopolymer of cyclopentene. The polymerization and polymer recovery procedures were the same as those used in the runs of Example I. The polymerization recipe and results are shown in Table II.

TABLE II (1) Conditions

Polymerization recipe:
- Toluene, parts by weight _____ 435
- Cyclopentene, parts by weight _____ 100
- Molybdenum trichloride dilaurate, mhm. ____ 2.9
- Diethylaluminum chloride, mhm. _____ 4.4
- Dicyclopentadiene, mhm. _____ Var.
- Temperature, ° C. _____ 5
- Time, hours _____ 4

(2) Results

| Run No. | Dicyclo-pentadiene, mhm. | Percent of— Conversion | Percent of— Unsaturation | Inherent viscosity | Percent of— Trans | Percent of— Gel | Cold flow, mg./min. |
|---|---|---|---|---|---|---|---|
| 1 | 0 | 55 | 99 | 3.06 | 91 | 0 | 1.83 |
| 2 | 1.0 | 59 | ---- | 2.93 | ---- | 0 | 0.91 |
| 3 | 10.0 | 61 | 99 | 3.07 | 88 | 0 | 0 |
| 4 | 0 | 60 | 98 | 3.03 | 95 | 0 | 2.06 |
| 5 | 20 | 64 | 100 | 3.43 | 88 | 0 | 0 |
| 6 | 0 | 59 | ---- | 2.87 | 88 | 0 | 2.12 |
| 7 | 20 | 64 | ---- | 3.34 | 89 | 0 | 0 |

The results show clearly the effect of small amounts of dicyclopentadiene, i.e., the copolymers, have significantly reduced cold flow compared to the homopolymers.

EXAMPLE III

In a manner essentially identical with Example I, cyclopentene was polymerized using a molybdenum trichloride dioctanoate diethylaluminum chloride catalyst system. Toluene was the diluent and the polymerization was carried out in both the presence and absence of dicyclopentadiene and 1-hexene. Monomer charge order was cyclopentene, 1-hexene, and dicyclopentadiene. The recipe and results are summarized in Table III.

TABLE III (1) Conditions

Polymerization recipe:
- Toluene, parts by weight _____ 450.
- Cyclopentene, parts by weight _ 100.
- 1-hexene, parts by weight ____ Var.
- Dicyclopentadiene (DCPD), parts by weight _____ Var.
- Diethylaluminum chloride ____ 0.40 (3.32 mhm.).
- Molybdenum trichloride dioctanoate _____ 0.76 (2.28 mhm.).
- Temperature, ° C. _____ 5 (41° F.).
- Time, hrs. _____ 4.3.

(2) Results

| Run No. | 1 | 2 | 3 | 4 |
|---|---|---|---|---|
| 1-hexene phm.[a] | | 0.117 | 0.117 | |
| DCPD phm.[a] | | | 4.6 | 4.6 |
| Conversion, percent | 63 | 62 | 66 | 69 |
| Intrinsic viscosity [b] | 5.36 | 1.58 | 1.56 | 5.27 |
| Cold flow mg./min. | 0.0 | 70.4 | 27.7 | 0.0 |

[a] Parts by weight per 100 parts of cyclopentene.
[b] Determined in tetrahydrofuran at 25° C.

The effect of the presence of 1-hexene and dicyclopentadiene is indeed striking. In Run 4, the molecular weight, as indicated by intrinsic viscosity, of the copolymer is so high that it is unfit for processing in most conventional elastomeric applications. In Run 2, when 1-hexene is used, the molecular weight is lowered to a desirable figure. However, this is done at the expense of increasing cold flow. Run 3 demonstrates how the terpolymers of this invention offer a unique desirable combination of molecular weight and cold flow properties.

EXAMPLE IV

To determine the structure of the cyclic monoolefin, cyclic polyolefin polymers of this invention, two terpolymers were prepared using a procedure essentially the same as Example II, but with the amounts of dicyclopentadiene shown in Table IV. Toluene was the diluent, and 1-hexene was used to control molecular weight. The catalyst was the same as in Example II. The recipe is shown below in Table IV.

TABLE IV

| Run No. | 1 | 2 |
|---|---|---|
| Cyclopentene/DCPD wt. ratio | 70/30 | 80/20 |
| 1-hexene phm.[a] | 0.075 | 0.117 |
| Temperature, ° C. | 5 | 5 |
| Conversion | 49 | 64 |
| Time, hours | 0.75 | 4.2 |

[a] Based on cyclopentene and DCPD as monomers.

These polymers were reprecipitated three times, and stored in glass bottles, flushed with nitrogen, below 0° C. No antioxidant or shortstopping agents were used in order that these materials not interefere with nuclear magnetic resonance (NMR) analyses and infrared analyses.

NMR and infrared quantitative measurements indicated that the cyclopentene/DCPD weight ratio for the polymer of Run No. 1 was 55/45 and the ratio for the polymer of Run No. 2 was 81/19. The analysis also showed that the cyclopentene monomer unit was present in the polymer as

and the DCPD monomer unit was present as

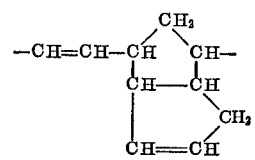

EXAMPLE V

In a manner substantially the same as Example I, cyclopentene was copolymerized with different cyclic diolefins in the presence of 1-hexene. After shortstopping the reactions at 60% conversion with 100 ml. of 80/20 toluene-isopropanol, the polymers were coagulated with isopropanol. After blending with 0.5 g. per 100 ml. of total coagulated mixture of a commercial antioxidant, the polymers were dried in an air oven for one hour, then in a vacuum oven. The recipe and results are summarized in Table V.

TABLE V

(1) Conditions

Polymerization recipe:
- Toluene, parts by weight _____ 450.
- Cyclopentene, parts by weight _ 100.
- 1-hexene, parts by weight _____ 0.050.
- Comonomer _____ 2.0 mhm.
- $MoCl_3(stearate)_2$ _____ 1.72 (2.25 mhm.).
- Diethylaluminum chloride _____ 0.41 (3.4 mhm.).
- Temperature, °C. _____ 5

(2) Results

| Comonomer: | Cold flow, mg./min. |
|---|---|
| None (control) | 18 |
| Dicyclopentadiene | 9.4 |
| Bicyclo-2,2,1-hepta-2,5-diene | 12.5 |

The above runs demonstrate that bicyclo-2,2,1-hepta-2,5-diene is a suitable comonomer in preparing cyclic monoolefin, cyclic polyolefin copolymers and terpolymers with 1-hexene.

EXAMPLE VI

Runs were carried out to demonstrate the polymerization of cyclopentene using various catalysts in the absence of added polymerization diluent. To various sized predried crown cap beverage bottles cyclohexene was charged followed by a nitrogen purge. After capping, cyclohexene was discharged until the bottle was dry. Ingredients were then charged in the order: cyclopentene and aluminum compound. The reactor was then heated to the desired reaction temperature, and finally the molybdenum component was charged. The polymerization recipe and results are summarized in Table VI.

The preceding data demonstrates that various Mo-containing compounds are active for polymerization of cyclopentene.

EXAMPLE VII

Various catalysts were employed to polymerize cyclopentene as in Example VI. In the following table, abbreviations for the aluminum component of the catalyst are as follows:

MASC—Methylaluminum sesquihalide
EADC—Ethylaluminum dichloride
DEAC—Diethylaluminum chloride The polymerization recipe and results are summarized in Table VII.

TABLE VII

(1) Conditions

Polymerization recipe:
- Toluene, parts by weight _____ 435
- Cyclopentene, parts by weight _____ 100
- Metal component _____ Var.
- Organometal component _____ Var.
- Temperature, °C. _____ 5
- Time, hrs. _____ Var.

Charge order: toluene, $N_2$ purge, metal component, adjust temperature to 0° C., cyclopentene, organometal component, place in 5° C. polymerization bath

(2) Results

| Run No. | Metal component,$^g$ mhm. | Organometal, mhm. | Time, hrs. | Percent of— Unsaturation | Percent of— Conversion | Trans | Inherent$^f$ viscosity |
|---|---|---|---|---|---|---|---|
| 1$^{a\ d}$ | $MoCl_3(St)_2(NO)_x$, 6.6 | MASC, 18.3 | 24 | 95 | 20 | | 3.20 |
| 2$^b$ | $Mo(\varphi_3P)_2(NO)_2Cl_2$, 1.3 | MASC, 1.8 | 24 | 70 | 28 | | 6.30 |
| 3$^c$ | $Mo(AcAc)_5$, 3 | EADC, 9 | 6 | 98 | 38 | 92 | 3.51 |
| 4 | $MoOCl_4$, 3 | DEAC, 3 | 69 | 94 | 15 | 87 | 2.27 |
| 5 | $MoCl_4(pyridine)_2$, 3 | DEAC, 3.5 | 18 | 97 | 45 | 97 | 2.98 |
| 6 | $MoCl_3(St)_2{}^e$, 3 | DEAC, 3 | 22 | 100 | 68 | | 3.51 |
| 7 | $MoCl_2(St)_3$, 2.4 | DEAC, 6 | 96 | 98 | 67 | 90 | 1.88 |
| 8 | $WCl_4(St)_2$, 3.2 | DEAC, 2.5 | 21 | 98 | 59 | 90 | 2.42 |
| 9 | $WCl_4(St)_2$, 2 | Et Mg, 4 | 6 | | 56 | 88 | 1.33 |
| 10 | $MoOCl_2(St)$, 3.6 | DEAC, 6 | 24 | | 71 | | 2.30 |
| 11 | $MoO_2(AcAc)_2$, 2 | EADC, 4 | 20 | | 72 | 97 | 2.81 |
| 12 | $MoCl_3(oleate)_2$, 1.8 | DEAC, 3 | 4 | 100 | 52 | 85 | 5.03 |
| 13 | $MoCl_3(Hex)_2$, 3 | DEAC, 5 | 4 | 99 | 67 | 91 | 2.63 |
| 14 | $MoCl_3(Oct)_2$, 3 | DEAC, 5 | 4 | 99 | 67 | 88 | 2.89 |

$^a$ Polymerization was in 780 phm. cyclohexane.
$^b$ Polymerization was in 870 phm. toluene.
$^c$ Catalyst was preformed for 0.5 hour at 30° C. and polymerization was at 30° C.
$^d$ Composition uncertain, mhm. based on Mo content.
$^e$ Complex prepared by reacting lithium stearate with $MoCl_5$ in cyclohexane.
$^f$ All polymers were gel-free.
$^g$ St=Stearate; AcAc=Acetylacetonate; Hex=Hexanoate; $\varphi_3P$=Triphenylphosphine; Oct=Octanoate.

TABLE VI

(1) Conditions

Polymerization recipe:
- Cyclopentene, parts by weight _____ 100
- Molybdenum component _____ Var.
- Diethylaluminum chloride _____ Var.
- Temperature, °C. _____ Var.

(2) Results

| Run No. | Temp., °C. | Molybdenum catalyst$^a$ Type | Mmols (parts)$^b$ | Al/Mo ratio | Percent of— Conversion | Trans |
|---|---|---|---|---|---|---|
| 1 | 30 | $MoCl_3(St)_2$+NO | 2.71 (2.16) | 1.33 | 84 | 74 |
| 2 | 30 | $MoCl_5$+NO | 2.0 (0.55) | 2.25 | 18 | |
| 3 | 50 | $MoCl_3(St)_2$ | 0.5 (0.38) | 2.0 | 62 | |
| 4 | 50 | $MoCl_3(St)_2$+NO | 0.5 (0.40) | 2.4 | 74 | |
| 5 | 50 | $MoCl_3(St)_2$ | 0.5 (0.38) | 1.8 | 68 | 83 |
| 6 | 50 | $MoCl_3(Oct)_2$ | 0.5 (0.24) | 1.4 | 77 | 83 |

$^a$ St=Stearate; Oct=Octanoate.
$^b$ Per 100 grams of cyclopentene.

The above data of Table VII illustrates that various tungsten and molybdenum complexes in combination with organometals have good activity for the polymerization of cyclopentene.

EXAMPLE VIII

Various lower molecular weight olefin materials were employed to modify the molecular weight of poly(cyclopentene). The polymerization recipe and results are summarized in Table VIII.

TABLE VIII

(1) Conditions

Polymerization recipe:
- Toluene, parts by weight _____ 435.
- Cyclopentene, parts by weight __ 100.
- Lower molecular weight olefin _____ Var.
- $MoCl_3(laurate)_2$ _____ 1.74 (2.9 mhm.).
- Diethylaluminum chloride ____ 0.53 (4.4 mhm.).

Temperature, °C. _____ 5.
Time, hours _____ Var.

Charge order: Toluene, $N_2$ purge, $MoCl_3(laurate)_2$, adjust to 0° C., low molecular weight olefin, cyclopentene, DEAC, place in 5° C. polymerization bath

(2) Results

| Run No. | Acyclic olefin Name | Mhm. | Time, hrs. | Conversion, percent | Inherent[a] viscosity | Percent of Trans | Percent of Unsaturation |
|---|---|---|---|---|---|---|---|
| 1[b] | | | 24 | 71 | 3.76 | 94 | 86 |
| 2[b] | 1-pentene | 1 | 24 | 68 | 1.67 | 95 | 93 |
| 3[b] | do | 10 | 24 | 75 | 0.42 | 92 | 87 |
| 4[b] | 1-hexene | 1 | 24 | 68 | 1.69 | | |
| 5[b] | do | 10 | 24 | 76 | 0.41 | | |
| 6 | | | 4 | 60 | 3.40 | | 87 |
| 7 | 1,7-octadiene | 10 | 4 | 63 | 0.37 | | 86 |
| 8 | 1,9-decadiene | 10 | 4 | 68 | 0.34 | | |
| 9 | 1-hexene | 10 | 4 | 60 | 0.53 | 94 | 86 |
| 10 | Trans-2-hexene | 10 | 4 | 65 | 2.66 | 94 | 87 |
| 11[c] | | | 22 | 43 | 4.39 | | 86 |
| 12[c] | Styrene | 10 | 22 | 48 | 1.67 | | 73 |
| 13 | | | 4 | 61 | 2.97 | | 92 |
| 14 | cis-1,3-pentadiene | 1 | 4 | 61 | 2.69 | | |
| 15 | do | 10 | 4 | 53 | 0.79 | | 86 |
| 16 | trans-1,3-pentadiene | 1 | 4 | 64 | 2.85 | | |
| 17 | do | 10 | 4 | 48 | 0.90 | 92 | 84 |
| 18 | Ethylene and propylene | 1.0-1.0 | 96 | 78 | 0.37 | 100 | 68 |

[a] All polymers were gel free.
[b] Polymerization with $MoCl_3(stearate)_2$, 3.0 mhm. (2.30 phm.) instead of $MoCl_3(laurate)_2$.
[c] Polymerization with triisobutylaluminum, 2.9 mhm. (0.57 phm.) instead of DEAC

EXAMPLE IX

Cyclopentene polymers were prepared in the presence and absence of dicyclopentadiene comonomers using a $MoCl_3(Oct)_2$–DEAC catalyst system. When used, the acyclic olefin was 1-pentene. The polymerization recipe and properties of the polymers are summarized in Table IX.

TABLE IX

| Run No. | Mhm. DEAC | Mhm. $MoCl_3(Oct)_2$ | Pentene-1, phm.[a] | DCPD, mhm. | Conversion, percent | Mooney ML-4 | Inherent[b] viscosity | Cold flow, mg./min. |
|---|---|---|---|---|---|---|---|---|
| 1 | 1.4 | 1.0 | 0.04 | | 80 | 35 | 1.91 | 7.9 |
| 2 | 1.4 | 1.0 | 0.02 | | 78 | 69 | 2.30 | 1.4 |
| 3 | 1.75 | 1.0 | 0.05 | 18.9 | 71 | 43 | 1.90 | 0.2 |
| 4 | 2.50 | 1.0 | 0.04 | 18.9 | 79 | 42 | 2.42 | 0 |

[a] Based on cyclopentene alone.
[b] Based on cyclopentene alone.

Blends of the above polymers were prepared to provide polymers having a desired Mooney range (50-60 ML-4). The properties of the blends are summarized in Table X below.

TABLE X

| Blend No. | Run No. | Run No. in blend, wt. percent | Inherent viscosity | Mooney ML-4 | Trans percent |
|---|---|---|---|---|---|
| K | 1 / 2 | 37 / 63 | 2.12 | 53 | 84 |
| L | 3 / 4 | 84 / 16 | 1.98 | 51 | 80 |

The polymer blends were compounded in a standard tire tread recipe shown in Table XI and the properties of the compounded stocks are shown in Tables XII and XIII.

TABLE XI.—EVALUATION RECIPES

| Polymer designation | K | L |
|---|---|---|
| Weight | 100 | 100 |
| IRB #2[a] | 50 | 50 |
| Zinc oxide | 3 | 3 |
| Stearic acid | 2 | 2 |
| Philrich 5[b] | 10 | 10 |
| Sulfur | 1.75 | 1.75 |
| NOBS special[c] | 1.0 | 1.0 |

[a] Industry reference Black No. 2.
[b] Highly aromatic oil. Type 101 under ASTM D 2226-63T.
[c] N-oxydiethylene-2-benzothiazolesulfenamide.

TABLE XII.—PROCESSING PROPERTIES

| Polymer | K | L |
|---|---|---|
| Raw ML-4 | 53 | 51 |
| Compound ML-4 | 80 | 69 |
| Extrusion, g./min.[a] | 80 | 84 |
| Feed rating, 0-10, 10 best | 7 | 7 |
| Extrusion shrinkage, percent | 66 | 68 |
| Green tensile, p.s.i | 40 | 29 |

[a] Ind. Eng. Chem., 34, 1309 (1942).

TABLE XIII.—PHYSICAL PROPERTIES OF VULCANIZATES

| Polymer | K | L |
|---|---|---|
| Raw, ML-4 | 53 | 51 |
| Total oil, phr | 10 | 10 |
| Cured 30 minutes at 307° F. | | |
| Compression set, percent[a] | 18 | 20 |
| 300% modulus, p.s.i.[b] | 1,500 | 1,650 |
| Tensile, p.s.i.[b] | 2,450 | 2,450 |
| Elongation, percent[b] | 400 | 390 |
| 200° F. tensile, p.s.i.[b] | 1,050 | 1,100 |
| Tear strength, 200° F., lbs./in.[c] | 60 | 90 |
| Heat buildup, (ΔT)[d] | 69 | 77 |
| Resilience, percent[e] | 72 | 66 |
| Flex. life, M.[f] | 0.7 | 1.9 |
| Shore A Hardness[g] | 64 | 64 |
| Aged 24 hours at 212° F. | | |
| 200% modulus, p.s.i | 1,450 | 1,600 |
| Tensile, p.s.i | 1,600 | 1,900 |
| Elongation, percent | 210 | 220 |
| ΔT, °F | 57 | 66 |
| Resilience, percent | 77 | 73 |
| Flex. life, M | <0.1 | <0.1 |

[a] ASTM D 395-61; [b] ASTM D 412-66; [c] ASTM D 624-54; [d] ASTM D 623-62; [e] ASTM D 945-59; [f] ASTM D 813-59; [g] ASTM D 1706-61.

Generally, the cyclopentene-dicyclopentadiene - 1 - pentene copolymer exhibited improved processing properties during compounding when compared with the cyclopentene-1-copolymer. Table XII above shows that the cyclopentene-DCPD-1-pentene copolymer exhibited good processing properties although the cold flow of the raw polymer blend had been reduced significantly.

Reasonable variation and modification of the invention is possible without departing from the spirit and scope thereof.

We claim:

1. An unsaturated vulcanizable copolymer comprising units of a cyclic monoolefin having 5 or 7-10 carbon atoms per molecule, obtained by ring opening with retention of unsaturation in the unit and units of a fused ring cyclic polyolefin having at least one double bond in at least two of the rings and from about 7 to about 20 carbon atoms per molecule, wherein the amount of said cyclic polyolefin is from about 0.1 millimoles per 100 grams of cyclic monoolefin to 50 parts by weight of cyclic polyolefin per 100 parts by weight of combined cyclic monoolefin and cyclic polyolefin.

2. The composition of claim 1 wherein the amount of cyclic polyolefin present in the copolymer is in the range of 10 to 200 millimoles per 100 grams of cyclic monoolefin monomer.

3. The composition of claim 2 wherein the cyclic monoolefin is cyclopentene, cycloheptene, cyclooctene, cyclononene or cyclodecene and the cyclic polyolefin is dicyclopentadiene, bicyclo(2,2,1)-hepta-2,5-diene, tricyclo-(5,2,3,0$^{4,9}$)-dodeca-2,5,11-triene, or bicyclo(2,2,2)-octa-2,5,7-triene.

4. The composition of claim 3 wherein the cyclic monoolefin is cyclopentene and the cyclic polyolefin is dicyclopentadiene, or bicyclo(2,2,21)-hepta-2,5-diene.

5. The composition of claim 1 wherein the copolymer comprises linear units of the cyclic monoolefin monomer and units of the cyclic polyolefin monomer which retain at least one double bond in the unit.

6. The composition of claim 1 wherein the cyclic monoolefin is cyclopentene which is present in the copolymer as a repeating unit represented by the formula

and the cyclic polyolefin is dicyclopentadiene which is present in the polymer as a unit represented by the formula

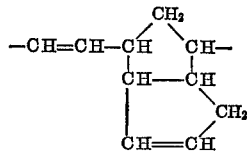

7. An unsaturated vulcanizable polymer comprising units of a cyclic monoolefin having 5 or 7–10 carbon atoms per molecule obtained by ring opening with retention of the double bond in the unit, units of a cyclic polyolefin which is a monocyclic polyolefin having from 5 to about 12 carbon atoms per molecule and having at least two double bonds separated by a single bond or a fused ring cyclic polyolefin having from about 7 to about 20 carbon atoms per molecule and having at least one double bond in at least two of the rings, and units of an acyclic olefin, wherein the amount of said cyclic polyolefin is from about 0.1 millimoles per 100 grams of cyclic monoolefin to 50 parts by weight of cyclic polyolefin per 100 parts by weight of combined cyclic monoolefin and cyclic polyolefin and the amount of said acyclic olefin is from 0.01 to 10 parts by weight per 100 parts by weight of the other monomers.

8. The composition of claim 7 wherein the acyclic olefin is a nontertiary, acyclic mono- or polyene having at least 2 carbon atoms per molecule, including cycloalkyl, cycloalkenyl and aryl derivatives thereof, or mixtures of said acyclic olefins and wherein the amount of said cyclic polyolefin is from 10 to 200 millimoles per 100 grams of cyclic monoolefin and the amount of said acyclic olefin is from 0.05 to 1.0 parts by weight per 100 parts by weight of the other monomers.

9. The composition of claim 8 wherein the cyclic monoolefin is cyclopentene, cycloheptene, cyclooctene, cyclononene, or cyclodecene, the cyclic polyolefin is cyclopentadiene, 1,3-cyclohexadiene, 1,3-cyclooctadiene, 1,3,5-cyclooctatriene, dicyclopentadiene, bicyclo(2,2,1)-hepta-2,5-diene, tricyclo(5,2,3,0$^{4,9}$)-dodeca-2,5,11-triene, or bicyclo-(2,2,2)-octa-2,5,7-triene, and the acyclic olefin is an acyclic monoolefin having 5 to about 10 carbon atoms per molecule.

10. The composition of claim 9 wherein the cyclic monoolefin is cyclopentene, the cyclic polyolefin is cyclopentadiene, dicyclopentadiene, or bicyclo(2,2,1-hepta-2,5-diene, and the acyclic olefin is 1-pentene, 1-hexene, propylene, ethylene, styrene, 1,7-octadiene, 1,9-decadiene, 2-hexene, 1,3-pentadiene, or a mixture of ethylene and propylene.

11. An unsaturated vulcanizable copolymer comprising units of a cyclic monoolefin having 5 or 7–10 carbon atoms per molecule, obtained by ring opening with retention of unsaturation in the unit and units of a fused ring cyclic polyolefin having at least one double bond in at least two of the rings and from about 7 to about 20 carbon atoms per molecule, wherein the amount of cyclic polyolefin in the copolymer is from about 0.1 to 500 millimoles per 100 grams of cyclic monoolefin monomer.

12. An unsaturated vulcanizable polymer comprising units of a cyclic monoolefin having 5 or 7–10 carbon atoms per molecule obtained by ring opening with retention of the double bond in the unit, units of a cyclic polyolefin which is a monocyclic polyolefin having 5 to about 12 carbon atoms per molecule and having at least two double bonds separated by a single bond or a fused ring cyclic polyolefin having from about 7 to about 20 carbon atoms per molecule and having at least one double bond in at least two of the rings, and units of an acyclic olefin, wherein the amount of cyclic polyolefin in the polymer is from about 0.1 to 500 millimoles per 100 grams of cyclic monoolefin and the amount of acyclic olefin is from 0.01 to 10 parts by weight per 100 parts by weight of the other monomers.

References Cited

UNITED STATES PATENTS

| | | | |
|---|---|---|---|
| 1,982,707 | 12/1934 | Thomas | 260—2 |
| 2,930,782 | 3/1960 | Schmerling | 260—88.2 |
| 3,083,246 | 3/1963 | Holtzman et al. | 260—683.15 |
| 3,196,138 | 7/1965 | Best | 260—93.7 |
| 3,444,146 | 5/1969 | Valvassori et al. | 260—79.5 |
| 3,467,632 | 9/1969 | Davis | 260—80.7 |
| 3,467,633 | 9/1969 | Harris et al. | 260—80.78 |
| 3,502,626 | 3/1970 | Dall'Asta et al. | 260—80.78 |
| 3,520,856 | 7/1970 | Dall'Asta | 260—79.5 |
| 3,577,400 | 5/1971 | Judy | 260—88.2 |
| 3,598,796 | 8/1971 | Nützel et al. | 260—88.2 |
| 3,624,060 | 11/1971 | Judy | 260—88.2 |

OTHER REFERENCES

European Polymer Journal, 7, pp. 707–716 (1971).

JOSEPH L. SCHOFER, Primary Examiner

S. M. LEVIN, Assistant Examiner

U.S. Cl. X.R.

260—23.7 M, 30.8 R, 80.78, 82.1, 88.2 D